United States Patent
Blomquist et al.

(10) Patent No.: US 6,943,232 B2
(45) Date of Patent: Sep. 13, 2005

(54) HALOGENATED OPTICAL POLYMER COMPOSITION

(75) Inventors: Robert Blomquist, Whippany, NJ (US); Jian Ming S. Deng, Brooklyn, NY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/253,057

(22) Filed: Sep. 23, 2002

(65) Prior Publication Data

US 2003/0181633 A1 Sep. 25, 2003

Related U.S. Application Data

(63) Continuation-in-part of application No. 10/067,669, filed on Feb. 4, 2002.

(51) Int. Cl.[7] .................................................. C08G 73/24
(52) U.S. Cl. ..................... 528/401; 526/70; 526/219; 525/276; 525/326.2; 525/330.7; 525/416; 525/452
(58) Field of Search .......................... 528/401, 70, 219; 525/276, 326.2, 330.7, 416, 452

(56) References Cited

U.S. PATENT DOCUMENTS

| | | |
|---|---|---|
| 3,732,259 A | 5/1973 | Hari |
| 5,391,587 A | 2/1995 | Wu |
| 5,986,045 A | 11/1999 | Lau et al. |
| 6,136,929 A | 10/2000 | Han et al. |
| 6,191,233 B1 | 2/2001 | Kishine et al. |
| 6,306,563 B1 | 10/2001 | Xu et al. |
| 6,313,291 B1 | 11/2001 | Carignano et al. |
| 2002/0122647 A1 | 9/2002 | Blomquist et al. |

FOREIGN PATENT DOCUMENTS

EP        0521360 A2     6/1992

*Primary Examiner*—Duc Truong

(57) ABSTRACT

The present invention provides an energy curable composition including a compound having an aromatic or heteroaromatic moiety; at least two fluorinated alkylene, arylene or polyether moieties, each fluorinated alkylene, arylene or polyether moiety being linked to the aromatic or heteroaromatic moiety through an —O— or —S— linkage; and at least one ethylenically unsaturated moiety, each ethylenically unsaturated moiety being linked to one of the fluorinated alkylene, arylene or polyether moieties. The present invention also provides an energy curable composition including a compound having an isocyanurate moiety, three fluorinated alkylene, arylene, or polyether moieties linked to the isocyanurate moiety at the nitrogens of the isocyanurate, and at least one ethylenically unsaturated moiety linked to one of the fluorinated alkylene, arylene, or polyether moieties. The present invention further provides polymeric materials and optical devices made using these compositions.

17 Claims, 1 Drawing Sheet

HALOGENATED OPTICAL POLYMER COMPOSITION

CROSS-REFERENCE TO RELATED APPLICATION

This application is a continuation-in-part of U.S. patent application Ser. No. 10/067,669, entitled "HALOGENATED OPTICAL POLYMER COMPOSITION," filed Feb. 4, 2002 now pending, which is incorporated herein by reference, and of which the benefit of priority under 35 U.S.C. §120 is hereby claimed.

BACKGROUND OF THE INVENTION

1. Field of the Invention

The present invention relates generally to polymeric materials, and more specifically to halogenated polymeric materials useful in the construction of devices for telecommunications.

2. Technical Background

In optical communication systems, messages are transmitted by electromagnetic carrier waves at optical frequencies that are generated by such sources as lasers and light-emitting diodes. There is interest in such optical communication systems because they offer several advantages over conventional communication systems.

One preferred device for routing or guiding waves of optical frequencies from one point to another is an optical waveguide. The operation of an optical waveguide is based on the fact that when a light-transmissive medium is surrounded or otherwise bounded by an outer medium having a lower refractive index, light introduced along the axis of the inner medium substantially parallel to the boundary with the outer medium is highly reflected at the boundary, trapping the light in the light transmissive medium and thus producing a guiding effect along the longitudinal axis of the inner medium. A wide variety of optical devices can be made which incorporate such light guiding structures as the light transmissive elements. Illustrative of such devices are planar optical slab waveguides, channel optical waveguides, rib waveguides, optical couplers, optical splitters, optical switches, optical filters, arrayed waveguide gratings, waveguide Bragg gratings, and variable attenuators. For light of a particular frequency, optical waveguides may support a single optical mode or multiple modes, depending on the dimensions of the inner light guiding region and the difference in refractive index between the inner medium and the surrounding outer medium.

Optical waveguide devices and other optical interconnect devices may be constructed from organic polymeric materials. While optical devices built from planar waveguides made of glass are relatively unaffected by temperature, devices made from organic polymers may show a significant variation of properties with temperature. This is due to the fact that organic polymeric materials have a relatively high thermo-optic coefficient (dn/dT). Thus, as an organic polymer undergoes a change in temperature, its refractive index changes appreciably. This property can be exploited to make active, thermally tunable or controllable devices incorporating light transmissive elements made from organic polymers. One example of a thermally tunable device is a 1×2 switching element activated by the thermo-optic effect. Thus, light from an input waveguide may be switched between two output waveguides by the application of a thermal gradient induced by a resistive heater. Typically, the heating/cooling processes occur over the span of one to several milliseconds.

Most polymeric materials, however, contain carbon-hydrogen bonds which absorb strongly in the 1550 nm wavelength range that is commonly used in telecommunications applications, causing devices made from such materials to have unacceptably high insertion losses. By lowering the concentration of C—H bonds in a material by replacement of C—H bonds with C—D or C-halogen bonds, it is possible to lower the absorption loss at infrared wavelengths. While planar waveguides made from fluorinated polyimides and deuterated or fluorinated polymethacrylates have achieved single mode losses of as little as 0.10 dB/cm at 1300 nm, it is relatively difficult to make optical devices from these materials. For example, the processes by which these waveguides have typically been made includes the use of a reactive ion etching process, which is cumbersome and can cause high waveguide loss due to scattering. Further, deuteration is not an effective means of reducing loss in the 1550 nm wavelength range. Fluorinated polyimides and deuterated or fluorinated polymethacrylates have higher losses in the telecommunications window near 1550 mm typically on the order of 0.6 dB/cm. O—H and N—H bonds also contribute strongly to loss at wavelengths near 1310 nm and 1550 nm. Consequently, compositions are sought in which the concentrations of O—H and N—H bonds are minimal.

Photopolymers have been of particular interest for optical interconnect applications because they can be patterned using standard photolithographic techniques. Photolithography involves the selective polymerization of a layer of the photopolymer by exposure of the material to a pattern of actinic radiation. Material that is exposed to the actinic radiation is polymerized, whereas material that is not exposed remains unpolymerized. The patterned layer is developed, for example, by removal of the unexposed, unpolymerized material by an appropriate solvent.

SUMMARY OF THE INVENTION

One aspect of the present invention relates to an energy curable composition including a compound having an aromatic or heteroaromatic moiety; at least two fluorinated alkylene, arylene or polyether moieties, each fluorinated alkylene, arylene or polyether moiety being linked to the aromatic or heteroaromatic moiety through an —O— or —S— linkage; and at least one ethylenically unsaturated moiety, each ethylenically unsaturated moiety being linked to one of the fluorinated alkylene, arylene or polyether moieties.

Another aspect of the present invention relates to an energy curable composition including a compound having an isocyanurate moiety; three fluorinated alkylene, arylene, or polyether moieties linked to the isocyanurate moiety at the nitrogens of the isocyanurate; and at least one ethylenically unsaturated moiety linked to one of the fluorinated alkylene, arylene, or polyether moieties.

Another aspect of the present invention relates to a polymeric material, the polymeric material including a polymer or copolymer of an energy curable compound, the energy curable compound having an aromatic or heteroaromatic moiety; at least two fluorinated alkylene, arylene or polyether moieties, each fluorinated alkylene, arylene or polyether moiety being linked to the aromatic or heteroaromatic moiety through an —O— or —S— linkage; and at least one ethylenically unsaturated moiety, each ethylenically unsaturated moiety being linked to one of the fluorinated alkylene, arylene or polyether moieties.

Another aspect of the present invention relates to a polymeric material, the polymeric material including a polymer or copolymer of an energy curable compound, the energy curable compound having an isocyanurate moiety; three fluorinated alkylene, arylene, or polyether moieties linked to the isocyanurate moiety at the nitrogens of the isocyanurate; and at least one ethylenically unsaturated moiety linked to one of the fluorinated alkylene, arylene, or polyether moieties.

Another aspect of the present invention relates to an optical element including a polymeric core, the polymeric core including a polymer or copolymer of an energy curable compound having an aromatic or heteroaromatic moiety; at least two fluorinated alkylene, arylene or polyether moieties, each fluorinated alkylene, arylene or polyether moiety being linked to the aromatic or heteroaromatic moiety through an —O— or —S— linkage; and at least one ethylenically unsaturated moiety, each ethylenically unsaturated moiety being linked to one of the fluorinated alkylene, arylene or polyether moieties.

Another aspect of the present invention relates to an optical element including a polymeric core, the polymeric core including a polymer or copolymer of an energy curable compound having an isocyanurate moiety, three fluorinated alkylene, arylene, or polyether moieties linked to the isocyanurate moiety at the nitrogens of the isocyanurate, and at least one ethylenically unsaturated moiety linked to one of the fluorinated alkylene, arylene, or polyether moieties.

The compositions and devices of the present invention result in a number of advantages over prior art compositions and devices. For example, the compositions of the present invention have a very low optical loss at telecommunications wavelengths, making them suitable for the fabrication of planar waveguides and other optical devices. The compositions of the present invention can have a higher refractive index than analogous compositions not including aromatic or heteroaromatic moieties, making them useful in the tuning of the refractive indices of the different layers of an optical device. The compositions of the present invention may also have higher hydrolytic stability than analogous carboxylate ester-based compositions.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawing is included to provide a further understanding of the invention, and is incorporated in and constitute a part of this specification. The drawing illustrates one or more embodiment(s) of the invention, and together with the description serves to explain the principles and operation of the invention.

DETAILED DESCRIPTION OF THE PREFERRED EMBODIMENTS

Figure 1:
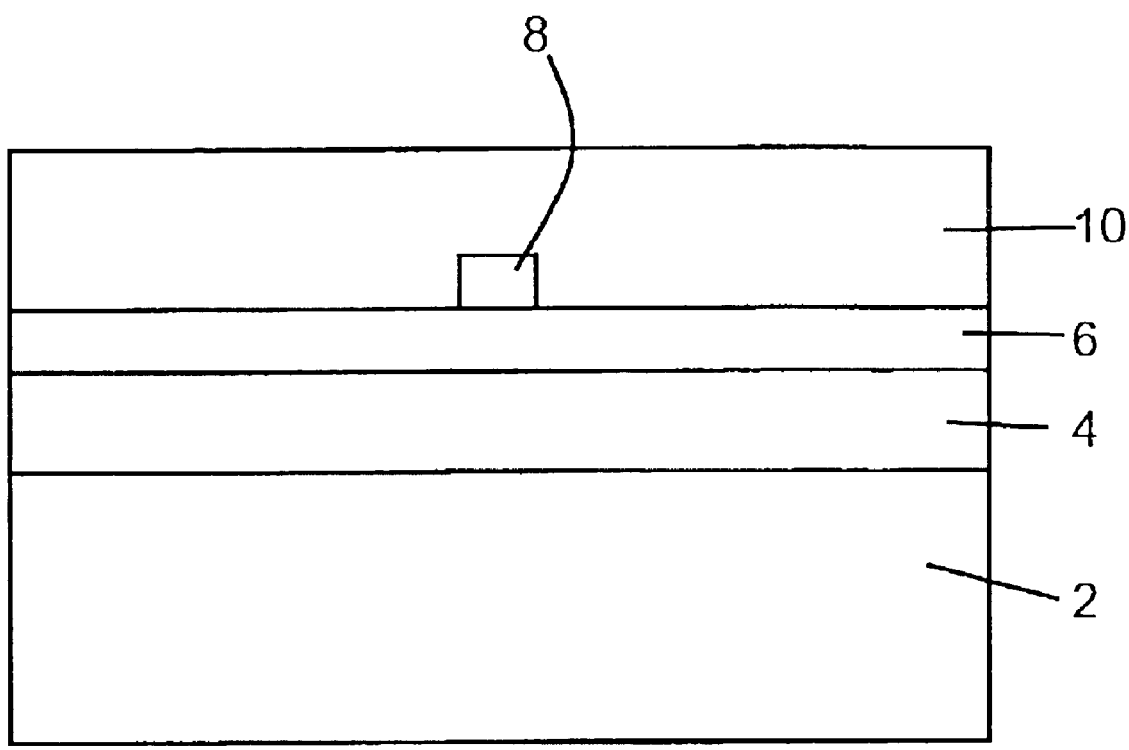
FIG. 1 is a schematic diagram of a planar waveguide optical element of the present invention.

The present invention provides an energy curable composition that may be cured to yield a polymeric material with a low optical loss at communications wavelengths. As used herein, an energy curable composition is a composition which may be cured by at least one of heat and actinic radiation. In one embodiment of the present invention, an energy curable composition includes a compound having an aromatic or heteroaromatic moiety; two fluorinated alkylene, arylene or polyether moieties each linked to the aromatic or heteroaromatic moiety through an —O— or —S— linkage; and at least one ethylenically unsaturated moiety linked to one of the fluorinated alkylene, arylene or polyether moieties. In especially suitable compounds for use in the compositions of the present invention, the —O— or —S— linkages are bound directly to an aromatic atom of the aromatic or heteroaromatic moiety. Desirable compounds for use in the compositions of the present invention have an ethylenically unsaturated moiety linked to each of the fluorinated alkylene, arylene, or polyether moieties. Linkage directly to an aromatic atom is preferable to linkage through intervening methylene groups, as it allows for compounds having lower losses at telecommunications wavelengths. Preferably, the —O— or —S— linkage is not part of a carboxylate ester. For example, the energy curable compositions of the current invention may include a compound having formula (I):

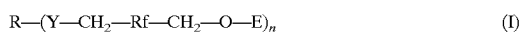

wherein R is an aromatic or heteroaromatic moiety; Y is O or S; Rf includes a fluorinated alkylene moiety, a fluorinated arylene moiety, or a fluorinated polyether moiety; E is an ethylenically unsaturated moiety; and n is an integer between about 2 and about 0.

As will be described more fully in connection with the examples below, —O— linked acrylates of the present invention (e.g. Y═O and E═CO—CH═CH$_2$ in the formula above) may be synthesized in two steps from the corresponding aromatic or heteroaromatic halide and fluorinated alkylene or polyether diol according to the reaction scheme:

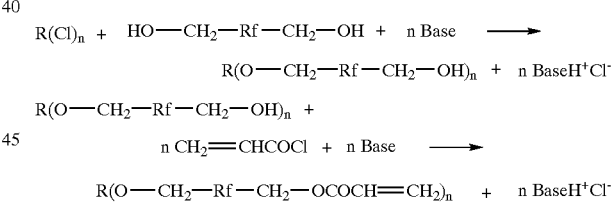

The aromatic or heteroaromatic halide is reacted with the fluorinated alkylene or polyether diol and n equivalents of base to yield an —O— linked alcohol. The —O— linked alcohol is then capped with acrylate to give the —O— linked acrylate of the present invention. Alternatively, the —O— linked alcohol may be capped with other ethylenically unsaturated moieties using methods familiar to the skilled artisan.

Compounds having Y═S and E═CO—CH═CH$_2$ in the above formula may be synthesized from the alkali salt of the corresponding aromatic or heteroaromatic polythiol and fluorinated alkylene, arylene or polyether diol according to the reaction scheme:

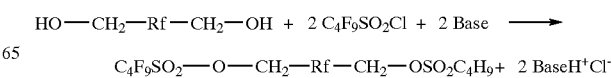

-continued

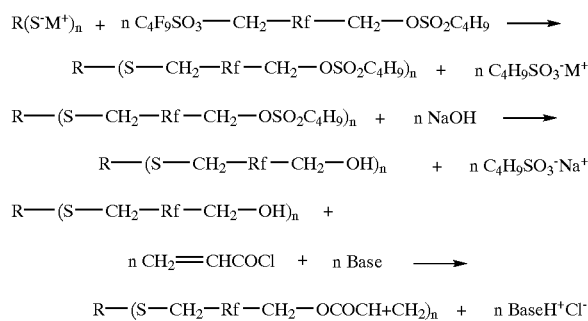

The fluorinated alkylene, arylene or polyether diol is converted to a bis(tetrafluorobutanesulfonate), which is reacted with the alkali salt of a polyfunctional aromatic or heteroaromatic polythiol. The resulting —S— linked tetrafluorobutanesulfonate is saponified to give a —S— linked alcohol, which is capped with acrylate to give the —S— linked acrylate of the present invention. Alternatively, the —S— linked alcohol may be capped with other ethylenically unsaturated moieties using methods familiar to the skilled artisan.

In the compounds described above, the aromatic or heteroaromatic moiety (R) may be any desired aromatic or heteroaromatic moiety. Desirable aromatic or heteroaromatic moieties for use in the present invention have a minimal number of hydrogen atoms. Especially desirable aromatic or heteroaromatic moieties have no hydrogen atoms at all. Examples of suitable aromatic moieties for use in the present invention include

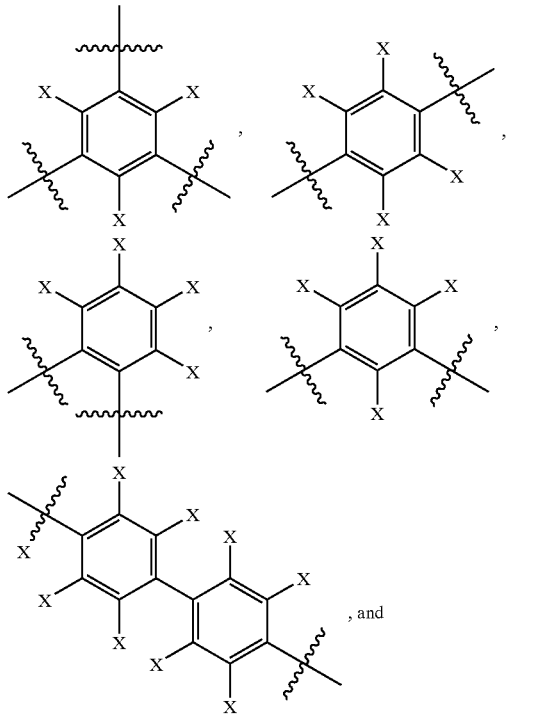

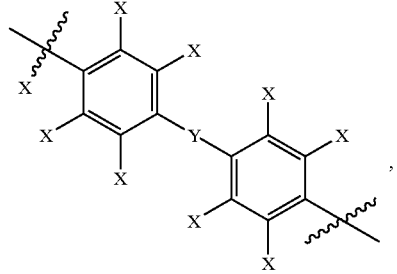

wherein each X is individually selected from the group consisting of H, D, F, Cl, Br, alkyl, aryl, heteroaryl, alkoxy and aryloxy, and wherein Y=O or S. As the skilled artisan will appreciate, other aromatic moieties may also be used in the present invention.

Examples of suitable heteroaromatic moieties include

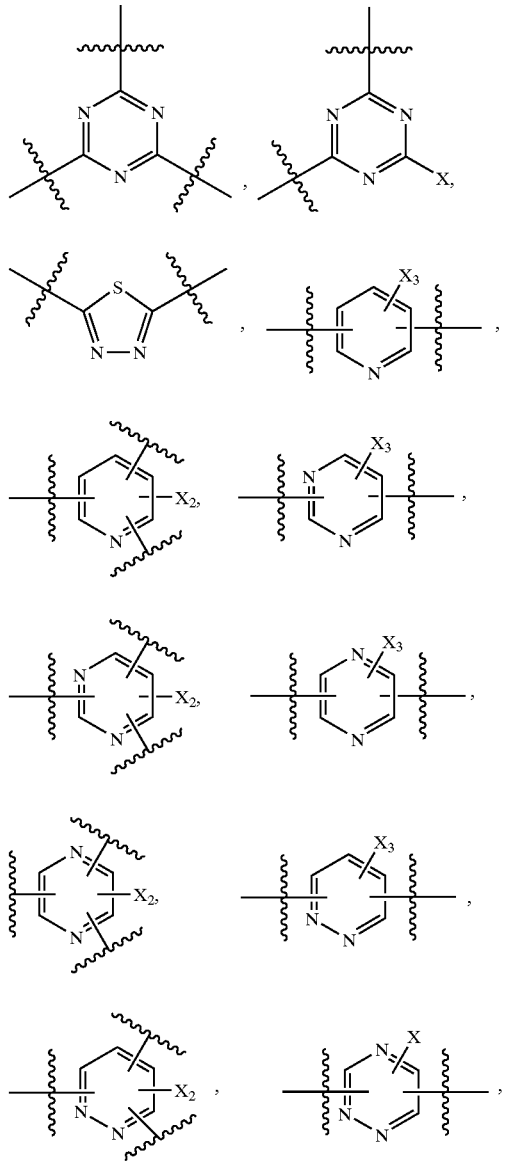

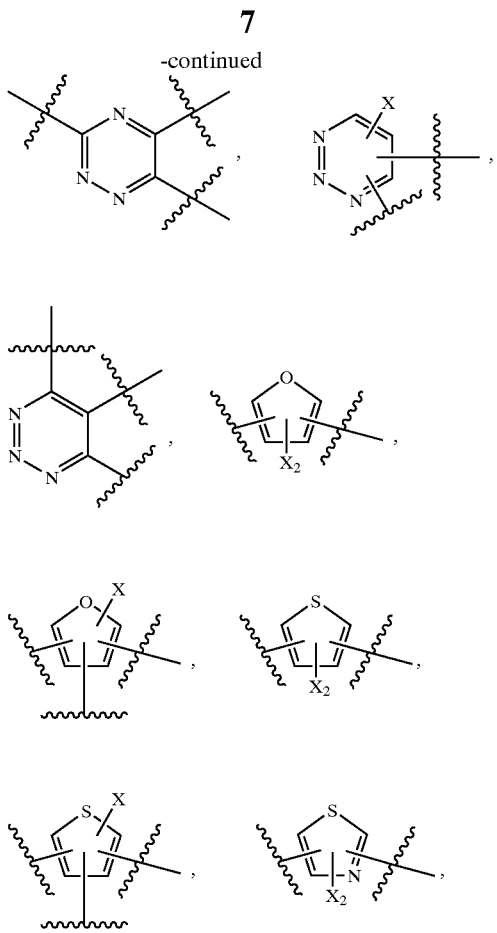
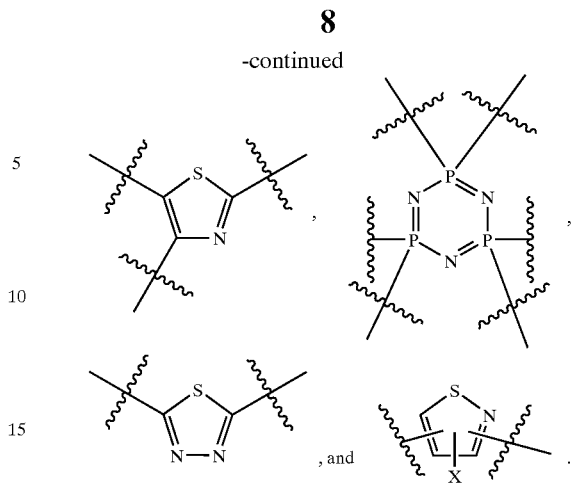

wherein each X is individually selected from the group consisting of H, D, F, Cl, Br, alkyl, aryl, heteroaryl, alkoxy and aryloxy. As the skilled artisan will appreciate, other heteroaromatic moieties may also be used in the present invention.

Another suitable heteroaromatic moiety is a cyclotriphosphazene moiety. —O— linked cyclotriphosphazene compounds may be made, for example, by reacting hexachlorocyclotriphosphazene with a suitable diol and sodium hydride, as shown in the reaction scheme below. —S— linked cyclotriphosphazene compounds may be made, for example, by reacting hexachlorocyclotriphosphazene with a suitable dithiol and metallic sodium, as shown in the reaction scheme below. The —O— linked and —S— linked alcohols can be capped with ethylenically unsaturated moieties using methods familiar to the skilled artisan.

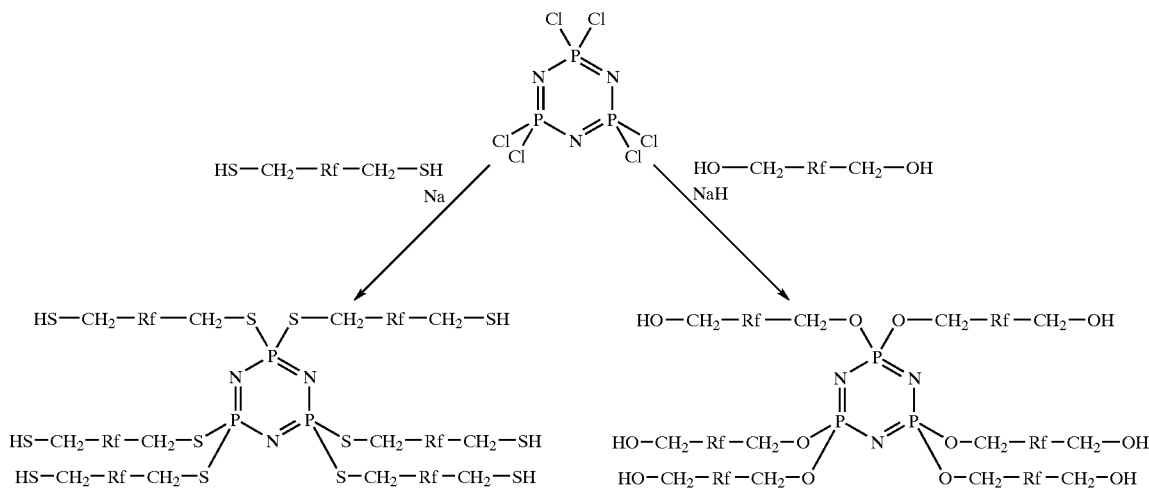

As described above, the aromatic or heteroaromatic moieties R are incorporated into the compounds of the present invention through their corresponding halides or sulfide salts. For example, the aromatic moiety octafluorobiphenylene may be incorporated using decafluorobiphenyl. The heteroaromatic 1,3,5-triazine moiety may be incorporated using cyanuric chloride. A 1,5-thiadiazoyl moiety may be incorporated using dipotassium 1,5-dimercaptothiadiazole.

In another embodiment of the present invention, energy curable compositions include a compound having an iso cyanurate moiety, three fluorinated alkylene, arylene or polyether moieties linked to the isocyanurate moiety at the nitrogens of the isocyanurate, and at least one ethylenically unsaturated moiety linked to one of the fluorinated alkylene, arylene or polyether moieties. Especially desirable compounds for use in the compositions of the present invention have ethylenically unsaturated moieties linked to each fluorinated alkylene, arylene, or polyether moiety. For example, an energy curable composition of the present invention may include a compound having formula (II):

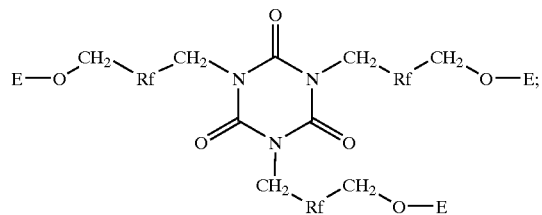
(II)

wherein Rf includes a fluorinated alkylene, arylene or polyether moiety and E is an ethylenically unsaturated moiety.

As is described more fully in U.S. Pat. No. 6,191,233, which is incorporated herein by reference, isocyanurate alcohols may be synthesized from cyanuric acid and a fluorinated alkylene or polyether diol according to the reaction:

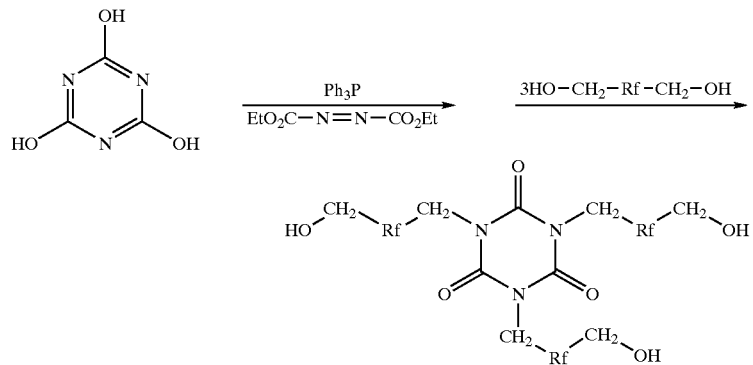

Activation of the alkylene or polyether diol with triphenylphospine/diethyl azodicarboxylate and reaction with cyanuric acid results in nucleophilic substitution at the nitrogens of the cyanuric acid, giving the isocyanurate alcohol. The isocyanurate alcohol is capped with an ethylenically unsaturated moiety using techniques familiar to the skilled artisan to yield the isocyanurate of formula (II).

In the compositions of the present invention, the fluorinated moieties (Rf) may be any desired fluorinated alkylene or arylene moiety. In one embodiment of the present invention, Rf has the formula —$(CF_2)_x$—, where x is between 1 and about 10. As described above, the fluorinated alkylene moiety is incorporated into the compounds of formulae (I) and (II) through the corresponding diol. Thus, 2,2,3,3,4,4,5,5-octafluorohexane-1,6-diol may be used to incorporate the fluorinated alkylene moiety —$(CF_2)_4$—. Likewise, 2,2,3,3,4,4,5,5,6,6,7,7-dodecafluorooctane-1,8-diol may be used to incorporate the fluorinated alkylene moiety —$(CF_2)_6$—. In another embodiment of the present invention, Rf has the formula —$(C_6F_4)_x$—, where x is between 1 and about 10. Similarly, 2,3,5,6-tetrafluoroxylene-α,α'-diol may be used to incorporate the fluorinated arylene moiety —$(C_6F_4)$— into the compounds of formula (I) and (II). As the skilled artisan will appreciate, other fluorinated diols may be used to provide different fluorinated alkylene or arylene moieties Rf.

The fluorinated moieties of the compositions of the present invention may also be fluorinated polyethers. Examples of suitable fluorinated polyether Rf moieties for use in the present invention include:

—$CF_2O$—$[(CF_2CF_2O)_m(CF_2O)_n]$—$CF_2$—,
—$CF(CF_3)O(CF_2)_4O[CF(CF_3)CF_2O]_pCF(CF_3)$—,
—$CF_2O$—$(CF_2CF_2O)_m$—$CF_2$—,
—$CF_2CF_2O$—$(CF_2CF_2CF_2O)_j$—$CF_2CF_2$—,
—$CF_2CF_2CF_2O$—$(CF_2CF_2CF_2CF_2O)_h$—$CF_2CF_2CF_2$—,
—$CF_2O$—$(CF_2CF_2O)_m$—$(CF_2CF_2CF_2CF_2O)_h$—$(CF_2CF_2O)_k$—$CF_2$—, and
—$CF_2O$—$(CF_2CF_2O)_m$—$(CF_2CF_2CF_2O)_i$—$CF_2CF_2O$—$(CF_2CF_2CF_2O)_j$—$(CF_2CF_2O)_kCF_2$—, wherein k and m designate numbers of randomly distributed perfluoroethyleneoxy backbone repeating substituents and can be integer or zero; i and j designate numbers of randomly distributed perfluoropropyleneoxy backbone repeating substituents and can be integer or zero; h designates the number of randomly distributed perfluorotetramethyleneeneoxy backbone repeating substituents and can be integer or zero; n designates the number of randomly distributed perfluoroethyleneoxy and perfluoromethyleneoxy backbone repeating subunits and can be integer or zero; and p designates the number of —$CF(CF_3)CF_2$— backbone repeating subunits and can be integer or zero.

These fluorinated polyethers are incorporated into the compounds of formula (I) of through the corresponding diol. For example, fluorinated polyether diols of the formula $HOCH_2CF_2O$—$[(CF_2CF_2O)_m(CF_2O)_n]$—$CF_2CH_2OH$ are available from Ausimont U.S.A. of Thorofare, N.J. under the trade name FLUOROLINK. FLUOROLINK D has a molecular weight of about 2000 g/mol, and FLUOROLINK D10 has a molecular weight of about 1000 g/mol. Fluorinated polyether diols of the formula $HOCH_2CF_2O$—$(CF_2CF_2O)_m$—$CF_2CH_2OH$ may also be used to provide the fluorinated polyether moiety of the compounds of formula (I). Fluorinated triethylene glycol (m=1) and fluorinated tetraethylene glycol (m=2) are available from Exfluor Research Corp. of Round Rock, Tex. Fluorinated poly (tetramethylene glycol) having the formula $HOCH_2CF_2CF_2CF_2O—(CF_2CF_2CF_2CF_2O)_1—CF_2CF_2CF_2CH_2OH$ with an average value of h of about 1.2 is available from Exfluor Research Corp. As the skilled artisan will appreciate, other fluorinated polyether moieties (e.g. a perfluorinated poly(propylene glycol)) may be incorporated in the compounds of the present invention through their corresponding polyether diols. The skilled artisan will likewise appreciate that samples of the polyethers used in the present invention may have a distribution of molecular weights, and therefore non-integral average values of the h, i, j, k, m, n and p subscripts described above.

As the skilled artisan will appreciate, the ethylenically unsaturated moieties of the present invention are not limited to the acrylates described in the Examples below. Alternative ethylenically unsaturated moieties such as methacrylate, haloacrylate, halomethacrylate, vinyl, allyl, and maleimide are contemplated for use in the present invention. Art-recognized methods for capping alcohols with alternative ethylenically unsaturated moieties may be used to form such compounds.

In other embodiments of the present invention, the energy curable compositions may include compounds which are the oligomeric homologues of Formula (I). Oligomeric compounds of the present invention include an aromatic or heteroaromatic core, and fluorinated alkylene, arylene or polyether moieties bound to the core through an —O— or —S— linkage. One or more additional —R—Y—CH$_2$—Rf—CH$_2$—Y— moieties are bound to the fluorinated alkylene, arylene or polyether moieties through an —O— or —S— linkage. The terminal —CH$_2$—Rf—CH$_2$—O— moieties are capped with ethylenically unsaturated moieties. For example, oligomeric compounds of the present invention may have the formula:

wherein each R is an aromatic or heteroaromatic moiety; each Y is O or S; each Rf includes a fluorinated alkylene moiety, a fluorinated arylene moiety, or a fluorinated polyether moiety; each E is an ethylenically unsaturated moiety; each j and m is 2, 3, or 4, and the sum of the n subscripts in each formula is 2, 3 or 4. As the skilled artisan will appreciate, the formulae above are intended only to be exemplary of oligomeric structures. Oligomers of the present invention may have a variety of alternative structures.

Similarly, the energy curable compositions may include compounds which are the oligomeric homologues of For mula (II). Oligomeric compounds of the present invention include an isocyanurate core, and fluorinated alkylene, arylene or polyether moieties bound to the isocyanurate through the nitrogens of the isocyanurate. One or more additional -isocyanurate-(CH$_2$—Rf—CH$_2$)— moieties are bound to the fluorinated alkylene, arylene or polyethermoieties through a nitrogen of the isocyanurate. The terminal —CH$_2$—Rf—CH$_2$—O— moieties are capped with ethylenically unsaturated moieties. For example, oligomeric compounds of the present invention may have the formula:

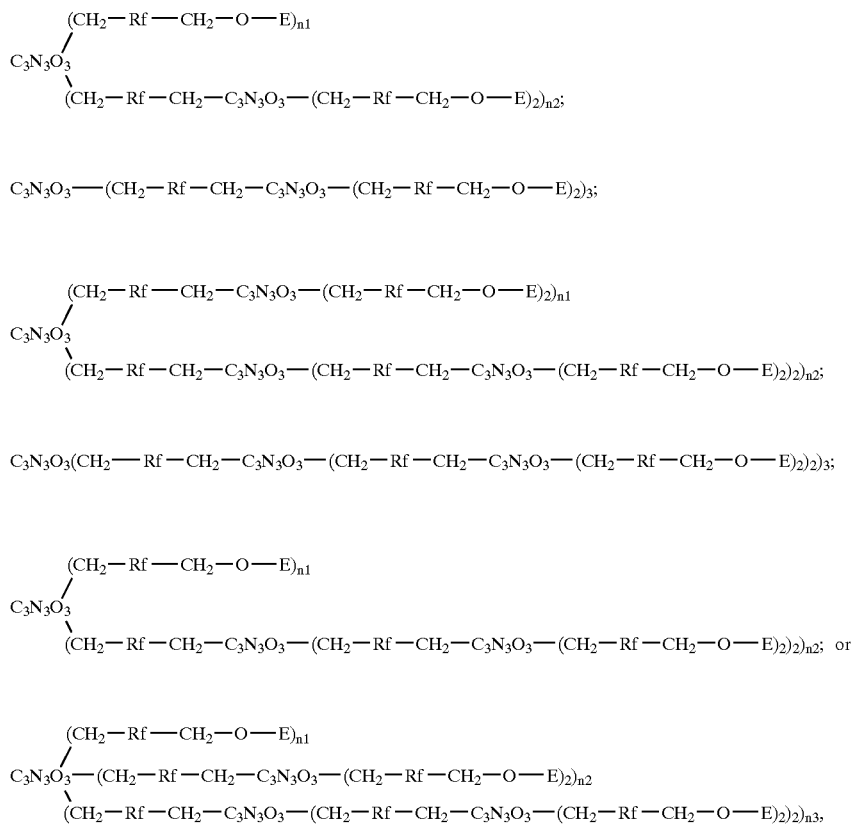

wherein C$_3$N$_3$O$_3$ is the isocyanurate nucleus; each Rf includes a fluorinated alkylene moiety, a fluorinated arylene moiety, or a fluorinated polyether moiety; each E is an ethylenically unsaturated moiety; each n, n1, and n2 is 0, 1, 2 or 3; and the sum of the n subscripts in each formula is 3. As the skilled artisan will appreciate, the formulae above are intended only to be exemplary of oligomeric structures. Oligomers of the present invention may have a variety of alternative structures.

The structures of the compounds of the present invention are chiefly determined by the mole ratios of the reactants used in forming the compounds. For example, reaction of one mole of cyanuric chloride with three moles of fluorinated diol gives a simple cyanurate ester alcohol:

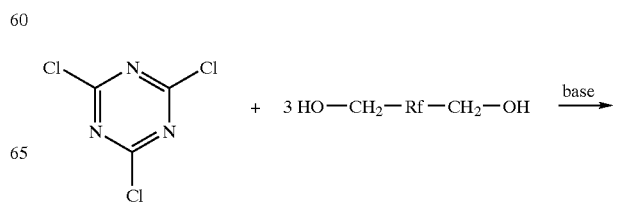

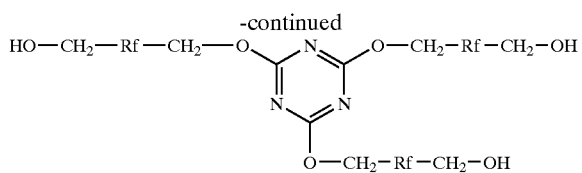

Increasing the relative amount of aromatic or heteroaromatic compound will allow for chain extension. For example, reaction of two moles of 1,4-dichlorobenzene with three moles of fluorinated diol yields an oligomeric —O— linked alcohol:

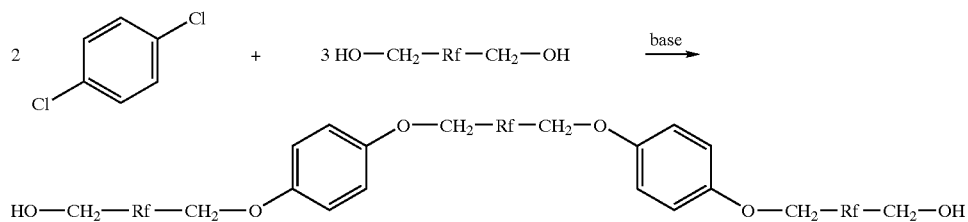

Mixed monomers and oligomers may be formed by using mixtures of fluorinated diols or (hetero)aromatic compounds.

The ethylenically unsaturated —O— linked, —S— linked, and isocyanurate compounds of the present invention typically have a molecular weight of from about 1,000 g/mol to about 10,000 g/mol. Desirable compounds have a molecular weight between about 2,000 g/mol and about 6,000 g/mol. Such compounds may be regarded as oligomers, macromers or macromolecular monomers. Compounds with molecular weights of above 1,000 g/mol are non-volatile, and are therefore desirable in processes used in the fabrication of optical elements such as planar waveguide devices.

The macromers of this invention have a much higher viscosity than the monomers empolyed in conventional compositions used for preparing polymeric optical elements. Typically, the compositions of the present invention have a viscosity (as determined at 25° C. using a Gilmont failing ball viscometer in accordance with ASTM 1343-93) of at least 100 centiPoise, and up to several thousand centiPoise (e.g. 5,000 centiPoise). Viscosities of at least 100 centiPoise are especially desirable in the fabrication of planar waveguide devices from the compositions of the present invention.

The energy curable compositions of the present invention may include a selected amount of a free radical initiator. The free radical initiator can be a photoinitiator, generating free radical species upon exposure to actinic radiation. Any photoinitiator known to initiate the polymerization of acrylates can be used. The photoinitiator is desirably thermally inactive at common ambient temperatures, and is preferably inactive below about 60° C. Suitable free-radical type photoinitiators nonexclusively include quinoxaline compounds; the vicinal polyketaldonyl compounds; the alpha-carbonyls; the acyloin ethers; the triarylimidazolyl dimers; the alpha-hydrocarbon substituted aromatic acyloins; polynuclear quinones and s-triazines.

Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Typical photoinitiators are 1-hydroxycyclohexyl phenyl ketone (IRGACURE 184), benzoin, benzoin ethyl ether, benzoin isopropyl ether, benzophenone, benzodimethyl ketal (IRGACURE 651), 2,2-diethoxyacetophenone, 2-hydroxy-2-methyl-1-phenylpropan-1-one (DAROCLUR 1173), 1-[4-(2-hydroxyethoxy)phenyl]-2-hydroxy-2-methyl-propan-1-one (DAROCUR 2959), 2-methyl-1-[4-(methylthio)phenyl]-2-morpholinopropan-1-one (IRGACURE 907), 2-benzyl-2-dimethylamino-1-(4-morpholinophenyl)butan-1-one (IRGACURE 369), poly{1-[4-(1-methylvinyl)phenyl]-2-hydroxy-2-methylpropan-1-one} (ESACURE KIP), and [4-(4-methylphenylthio)-phenyl]phenylmethanone (QUANTACURE BMS from Great Lakes Fine Chemicals Limited of London, England). The most desired photoinitiators are those which tend not to yellow upon irradiation. Such photoinitiators include benzodimethyl ketal (IRGACURE 651), ethyl 2,4,6-trimethylbenzoylphenylphosphinate (LUCERIN TPO-L, available from BASF), 2-hydroxy-2-methyl-1-phenylpropan-1-one (DAROCUR 1173 available from Ciba Specialty Chemicals of Tarrytown, N.Y.), 1-hydroxycyclohexyl phenyl ketone (IRGACURE 184), and 1-[4-(2-hydroxyethoxy)phenyl]-2-hydroxy-2-methylpropan-1-one (DAROCUR 2959). For the more highly fluorinated energy curable compositions, such as those including L-12043 and L-9367 from 3M, a fluorinated photoinitiator such as 2-(1H,1H,2H,2H-heptadecafluoro-1-decoxy)-2-methyl-1-phenylpropan-1-one, described in U.S. Pat. No. 5,391,587, which is incorporated herein by reference, may be required.

Initiators for use in this invention may also include selected amounts of thermal initiators, generating free radical species upon exposure to heat. Suitable known thermal initiators include, but are not limited to, substituted or unsubstituted organic peroxides, azo compounds, pinacols, thiurams, and mixtures thereof. Examples of operable organic peroxides include, but are not limited to, benzoyl peroxide, p-chlorobenzoyl peroxide, methyl ethyl ketone peroxide, tert-butyl perbenzoate, cumene hydroperoxide, di-sec-butyl peroxide, and 1,1,-di(tert-butylperoxy)-3,3,5-trimethylcyclohexane. Suitable azo compound initiators include, but are not limited to, 2,2'-azobisisobutyronitrile, (1-phenylethyl)azodiphenylmethane, dimethyl-2,2'-azobis (1-cyclohexanecarbonitrile), and 2,2'-azobis(2-methylpropane). Additional examples of photo- and thermal initiators may be found in publications known to those skilled in the art.

The free radical generating initiator, photo or thermal, may be present in the energy curable composition in a selected amount sufficient to effect polymerization of the composition upon exposure to sufficient energy of an appropriate type. For example, a photoinitiator is present in an amount sufficient to effect polymerization upon exposure to sufficient actinic radiation. The initiator is generally present in an amount of from about 0.01% to about 10% by weight of the overall composition, or more usually from about 0.1% to about 6% and suitably from about 0.5% to about 4% by weight based on the total weight of the composition. Mixtures of initiators may also be used. In certain special cases, such as when curing via exposure to electron beam radiation, the energy curable composition may not require a free-radical initiator, since said free-radicals may be generated in situ via the action of the electron beam radiation.

Other additives may also be added to the energy curable compositions depending on the purpose and the end use of the compositions. Examples of these include solvents, antioxidants, photostabilizers, volume expanders, fillers such as for example silica, titania, glass spheres and the like (especially when in the nanoscale regime, particle size less than about 100 nm), dyes, free radical scavengers, contrast enhancers, nitrones and UV absorbers. Antioxidants include such compounds as phenols and particularly hindered phenols including IRGANOX 1010 from Ciba Specialty Chemicals of Tarrytown, N.Y.; sulfides; organoboron compounds; organophosphorous compounds; N,N'-hexamethylenebis(3,5-di-tert-butyl-4-hydroxyhydrocinnamamide) available from Ciba Specialty Chemicals under the tradename IRGANOX 1098. Photostabilizers and more particularly hindered amine light stabilizers include but are not limited to poly[(6-morpholino-s-triazine-2,4-diyl)[(2,2,6,6-tetramethyl-4-piperidyl)imino]-hexamethylene-[(2,2,6,6,-tetramethyl4-piperidyl)imino]] available from Cytec Industries of Wilmington, Del. under the trade name CYASORB UV-3346. Volume expanding compounds include such materials as the spiral monomers known as Bailey's monomer. Examples of dyes include methylene green, methylene blue, and the like. Suitable free radical scavengers include oxygen, hindered amine light stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. Each of these additives may be included in quantities up to about 6%, based upon the total weight of the composition, and usually from about 0.1% to about 1%.

The energy curable compositions of the present invention may include monomers other than the —O— linked, —S— linked and isocyanurate compounds described herein. For example, the compositions may include other low-loss halogenated monomers, such as the fluorinated acrylates described in U.S. Pat. No. 6,306,563. The compositions may also include non-halogenated monomers, such as ethoxylated bisphenol A diacrylate. As will be appreciated by the skilled artisan, the identities and amounts of the monomers and oligomers described herein and other monomers may be adjusted to lend desirable properties to the energy curable composition and the polymeric material made therefrom. The use of alternative monomers is limited strictly by their compatibility with the cured polymeric materials of the present invention. Usually, all components of the energy curable composition are in admixture with one another, and most desirably are in a substantially uniform admixture. The energy curable compositions of the present invention preferably include at least about 10% by weight of the (hetero)aromatic —O— linked, (hetero)aromatic —S— linked, or isocyanurate compounds described herein. The energy curable compositions of the present invention may include substantially more than 10% by weight of these compounds (e.g. 25%, 50%, 75%, 99.5%).

The present invention also includes polymeric materials which are polymers or copolymers of the compounds of the —O— linked, —S— linked and isocyanurate compounds described herein. The energy curable compositions of the invention may be polymerized by exposure to a suitable type and amount of energy. For example, compositions formulated with a thermal initiator may be polymerized by the application of heat. Initiation temperatures depend on the thermal initiator and usually range from about 60° C. to about 200° C., with temperatures between 70° C. and 100° C. being preferred. Thermal polymerization times may vary from several seconds to several hours, depending on the temperature and initiator used.

Compositions formulated with a photoinitiator may be polymerized by exposure to actinic radiation, defined as light in the visible, ultraviolet, or infrared regions of the electromagnetic spectrum, as well as electron beam, ion or beam, or X-ray radiation. Actinic radiation may be in the form of incoherent light or coherent light, for example, from a laser. Sources of actinic radiation and exposure procedures, times, wavelengths and intensities may vary widely depending on the desired degree of polymerization, the index of refraction of the material, and other factors known to those of ordinary skill in the art. Such conventional photopolymerization processes and their operational parameters are well known in the art. Sources of actinic radiation and the wavelength of the radiation may vary widely, and any conventional wavelength and source can be used. It is preferable that the photoinitiator require that photochemical excitation be carried out with relatively short wavelength (high energy) radiation, so that exposure to radiation normally encountered before processing (e.g. room lights) will not prematurely polymerize the energy curable composition. Thus, exposure to ultraviolet light or deep ultraviolet light are useful.

Convenient sources include high pressure xenon or mercury-xenon arc lamps filled with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-doubled argon ion laser with an output near 257 nm wavelength is highly desirable. Electron beam or ion beam excitation may also be used. Alternatively, the processing can utilize a multiphoton process initiated by a high intensity source of actinic radiation such as a laser. Typical exposure times vary from a few tenths of seconds to about several minutes depending on the actinic source. When partial curing is desired, curing levels between about 50% and 90% are generally preferred. Photopolymerization temperatures usually range from about 10° C. to about 60° C.; however, room temperature is preferred.

In evaluating the relative merits of a particular energy curable composition or polymeric material based on its structure, it is useful to determine the molar concentration of light-absorbing bonds to hydrogen for a particular candidate material. Since C—H, N—H, and O—H bond stretching vibrational overtones are a major source of absorption loss in the communications wavelengths, reduction of the concentration of these bonds will reduce the material absorption loss. The analogous overtone of sulfur-hydrogen bonds is very weak and appears above 1900 nm, and thus is not a significant source of absorption loss. The molar concentration of hydrogen ($C_H$) for a particular compound can be calculated from the number of C—H, N—H, and O—H bonds per molecule (H); the molecular weight of the compound (Mw), and the density of the material (ρ), as shown in the equation:

$$C_H = \frac{H \cdot \rho}{Mw}$$

The person of skill in the art will realize that the $C_H$ for a formulated energy curable composition may be calculated as a weighted average of the $C_H$ values of each individual constituent. While an exact relationship between $C_H$ and the absorption loss of a particular material or fabricated device is unlikely, this relation gives an initial indication of which materials may be useful in lowering optical loss values. When carrying out these calculations for a polymeric material, it is most appropriate to use the density of a cured film of the compound, as it is the loss of the cured film that is of greatest interest. However, since measuring the density of such films is difficult, the density of the liquid can be used with the understanding that the approximation does introduce a small amount of error. Suitable energy curable compositions and polymeric materials of the present invention have a $C_H$ of below about 55 M. Desirable energy curable compositions and polymeric materials have a $C_H$ of below about 30 M. Especially desirable energy curable compositions and polymeric materials have a $C_H$ of below about 20 M. For waveguide applications, the most desirable compositions and polymeric materials have a $C_H$ of below about 20 M, or even below about 10 M. As will be appreciated by the skilled artisan, $C_H$ may be controlled by judicious selection of the Rf and R moieties of the —O— linked, —S— linked and isocyanurate compounds described herein, as well as judicious selection of other monomers or oligomers in the energy curable composition. Compounds having Rf and R moieties with large molecular weights and few hydrogen atoms will tend to impart a low $C_H$ value to an energy curable composition, and therefore to the polymer formed therefrom. $C_H$ values for some exemplary materials are given in the Examples, below.

Energy curable compositions and polymeric materials of the present invention suitable for optical applications have an absorption loss of below about 0.5 dB/cm at a wavelength of 1550 nm. Desirable energy curable compositions and polymeric materials have an absorption loss of below about 0.3 dB/cm at a wavelength of 1550 nm. Especially desirable energy curable compositions and polymeric materials have an absorption loss of below about 0.2 dB/cm. Energy curable compositions and polymeric materials with absorption losses below about 0.15 dB/cm, or even below 0.1 dB/cm are very desirable. Absorption losses for representative energy curable compositions and polymeric materials of the present invention are given in the Examples, below.

The compounds, energy curable compositions, and polymeric materials of the present invention provide a number of advantages over conventional compounds, compositions and polymeric materials. For example, the compositions of the present invention have a very low $C_H$, and therefore very low optical loss at telecommunications wavelengths, making them suitable for the fabrication of planar waveguides and other optical devices. The compositions of the present invention can have a higher refractive index than analogous compositions not including aromatic or heteroaromatic moieties, making them useful in the tuning of the refractive indices of the different layers of an optical device. The compositions of the present invention also provide macromers having more than two ethylenically unsaturated moieties, providing a cured polymeric material with a high degree of crosslinking. The compositions of the present invention may also have higher hydrolytic stability than analogous carboxylate ester-based compositions.

The compositions and polymers of the present invention are especially useful in the fabrication of optical elements such as planar optical waveguides. A method for the fabrication of polymeric waveguides is disclosed in commonly held and copending U.S. patent application Ser. No. 09/846,697. An example of a waveguide structure appears in FIG. 1. In an embodiment of the present invention, a suitable substrate 2 is rigorously chemically cleaned, for example with concentrated aqueous sodium hydroxide. The substrate 2 may then be primed with acrylate-, thiol-, amino-, or isocyanato-functionalized chloro- or alkoxysilane compounds. For example, it may be treated with (3-acryloxypropyl)trichlorosilane. This is optionally followed by application, via spin coating, of a photosensitive adhesion promoting tie layer composition. In this and subsequent spin coating steps, the edge bead formed in the spinning process may be removed by methods known by the skilled artisan (e.g. rinsing the circumference of the wafer with a suitable solvent during the final seconds of the spin). The tie layer is preferably highly crosslinkable and contains either ethylenically unsaturated moieties, thiol moieties, or both. If used, the tie layer composition is exposed to sufficient actinic radiation to cure the tie layer to at least a level above its gel point. Alternatively, suitable tie layers may comprise other polymers such as epoxies, polyacrylates, or poly(vinyl ethers). Thereafter, a layer 4 of photosensitive buffer composition is applied by spin coating. The buffer composition is formulated in accordance with this invention, and is formulated, as described above, to have a refractive index when cured of about 1% to about 3% lower than that of a core material. The buffer composition is exposed to sufficient actinic radiation to partially cure it to a level below full cure and above its gel point. Then, a photosensitive clad composition 6 is applied to the surface 5 of the polymeric buffer layer by spin coating. The clad composition is formulated in accordance with this invention, and is formulated, as described above, to have a refractive index when cured of about 0.3% to about 1.5% lower than that of the core material. The laminate so constructed is exposed to sufficient actinic radiation to partially cure the clad composition to a level below full cure and above its gel point. Subsequently, a layer of the photosensitive, polymerizable core composition, formulated in accordance with this invention, is applied to the surface 7 of the polymeric clad layer by spin coating. The core composition is then imagewise exposed to sufficient actinic radiation to effect the at least partial polymerization of an imaged portion and to form at least one non-imaged portion of the core composition. For example, a photomask may be used. In this process, the photomask is lowered to a predetermined level above the core composition layer, usually less than about 20 μm above the core composition layer, and more usually from about 5 μm to about 20 μm above the core composition layer. The distance of the mask to the surface of the core composition layer may be controlled by, for example, using spacers such as thin wires of the desired thickness. Exposure through the photomask with sufficient actinic radiation to partially cure the core composition to a level below full cure and above its gel point yields areas of exposed, partially polymerized core, and unexposed liquid core composition.

Alternatively, the core composition may be imaged by writing with a well-defined beam of actinic radiation such as that generated by a laser. Regardless of the method of exposure, the unexposed core composition may be developed by rinsing with a suitable solvent, leaving an exposed, partially polymerized patterned core 8. The patterned core may define, for example, waveguide structures with a rectangular or square cross-section. Subsequently, a photosensitive overclad composition 10 is applied to the surface 9 of the core by spin coating. The overclad composition coats the top and sides of the patterned core features. The overclad composition is formulated in accordance with this invention, and is formulated, as described above, to have a refractive index when cured of about 0.3% to about 1.5% lower than that of the core material. The structure is exposed to sufficient actinic radiation to completely cure the film. Finally, the structure may thermally annealed to ensure complete polymerization of all layers and remove any residual volatile substances.

A cross-sectional view of an example of a waveguide structure in accordance with the present invention appears in FIG. 1. The structure includes a polymeric patterned core 8 including a polymeric material which is a polymer or copolymer of the compound of formula (I). The polymeric patterned core is contiguous on at least one side with a polymeric clad layer 6, and contiguous on at least one side with a polymeric overclad layer 10. The clad layer is disposed above a substrate 2. The clad layer either rests directly on the substrate, or rests upon a buffer layer 4 that rests upon the substrate. The skilled artisan will appreciate that the many alternative art-recognized waveguide structures that can be made using the compositions and polymers disclosed herein are contemplated within the scope of this invention. Waveguide structures of the present invention have propagation losses of less than 0.5 dB/cm, 0.3 dB/cm, 0.2 dB/cm, 0.15 dB/cm, and even 0.1 dB/cm.

As will be appreciated by a person of skill in the art, the thicknesses and refractive indices of the layers are critical to waveguide device performance. The refractive indices of the layers may be defined by judicious formulation of the energy curable compositions of the present invention. The —O— linked, —S— linked and isocyanurate compounds of the present invention tend to have higher refractive indices than do the analogous diol acrylates. As will be more fully described in the Examples, below, the skilled artisan can formulate energy curable compositions with selected refractive indices by using different relative amounts of compounds of formulae (I) and (II) and other energy curable monomers. Usually, the refractive index of the core is in the range of from about 1.30 to about 1.7. The refractive indices of the buffer, clad, and overclad layers should be lower than that of the core, as described above. Thicknesses of the layers are determined in the spin coating step by spin speed and duration and by the viscosity of the energy curable composition. The height of the waveguides of the core layer is defined by the spin coating step, while the width of the waveguides is determined by the dimensions of the features of the photomask. The dimensions and refractive indices of the layers are chosen by known methodologies to lend the desired waveguiding properties to the final device. In an embodiment of the invention, a single mode waveguide has core cross-sectional dimensions of about 7 μm by 7 μm, core refractive index at 1550 nm of about 1.323, underclad thickness of about 2 μm, underclad refractive index at 1550 nm of about 1.316, buffer thickness of about 10 μm, buffer refractive index at 1550 nm of about 1.308, overclad thickness of about 15 μm, and overclad refractive index at 1550 nm of about 1.316.

EXAMPLES

Example 1

In a 3-neck flask, equipped with a mechanical stirrer, dropping funnel, and thermocouple, were combined 250 g (0.25 mol) FLUOROLINK D10, 15 g cyanuric chloride (0.082 mol), 0.25 g butylated hydroxytoluene (BHT), 300 mL toluene, and 300 mL ethyl nonafluorobutyl ether (available from 3M under the trade name HFE-7200). The reaction mixture was cooled with ice, and 40 mL triethylamine (0.28 mol) was added dropwise with stirring. The temperature of the reaction mixture was maintained below 30° C. during the addition. The reaction mixture was stirred at room temperature overnight.

The reaction mixture was again cooled with ice, and 25 mL acryoyl chloride (0.31 mol) was added dropwise. The temperature of the reaction mixture was maintained below 30° C. during the addition. The reaction mixture was stirred at room temperature for three hours.

The reaction mixture was again cooled with ice, and 35 mL triethylamine was added. The reaction mixture was allowed to stir at room temperature overnight, then washed three times with methanol, concentrated by rotary evaporation, and passed through a 0.2 μm filter. NMR has confirmed the molecular structure of the resultant colorless liquid to be:

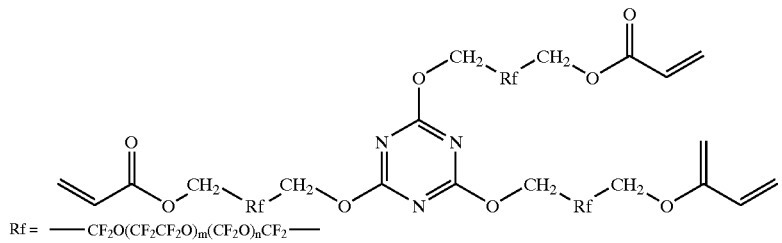

Rf = ——CF$_2$O(CF$_2$CF$_2$O)$_m$(CF$_2$O)$_n$CF$_2$——

This compound had a liquid loss of 0.10 dB/cm at a wavelength of 1550 nm. This compound had a C$_H$ of about 11 M. α,α-diethoxyacetophenone (1 wt %) was added to a small sample of the compound. The resulting energy curable composition was cured for 300 seconds with UV light while being purged with nitrogen. The refractive index of the cured sample was 1.323 at a wavelength of 1550 nm.

Example 2

In a 3-neck flask, equipped with a mechanical stirrer, dropping funnel, and thermocouple, were combined 51.3 g perfluorotetraethylene glycol (0.125 mol), 7.42 g cyanuric chloride (0.04 mol), and 100 mL acetonitrile. The reaction mixture was cooled with ice, and 40 mL triethylamine (0.28 mol) was added dropwise with stirring. The temperature of the reaction mixture was maintained below 30° C. during the addition. The reaction mixture was stirred at room temperature for one hour.

BHT (0.1 g) was added to the reaction mixture. The reaction mixture was again cooled with ice, and 11.5 mL acryloyl chloride (0.141 mol) was added dropwise. The temperature of the reaction mixture was maintained below 30 C. during the addition. The reaction mixture was stirred at room temperature overnight.

The reaction mixture was washed three times with methanol, then concentrated by rotary evaporation and passed through a 0.2 μm filter. NMR has confirmed the molecular structure of the resultant colorless liquid to be:

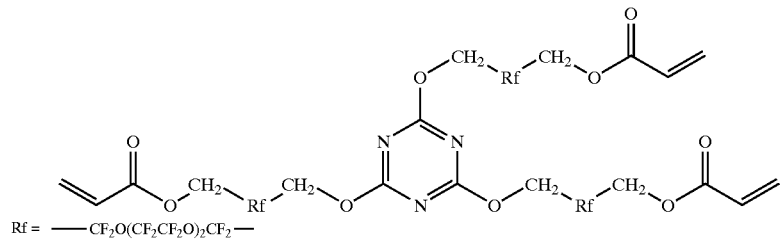

Rf = —CF₂O(CF₂CF₂O)₂CF₂—

This compound had a liquid loss of 0.27 dB/cm at a wavelength of 1550 nm. This compound had a $C_H$ of about 24 M. α,α-diethoxyacetophenone (1 wt %) was added to a small sample of the compound. The resulting energy curable composition was cured for 300 seconds with UV light while being purged with nitrogen. The refractive index of the cured sample was 1.368 at a wavelength of 1550 nm.

Example 3

In a 3-neck flask, equipped with a dropping funnel, a magnetic stir bar and thermocouple, were combined 10.84 g hexachlorobenzene (0.038 mol) and 100 mL dimethylacetamide. The mixture was heated at 110° C. while being magnetically stirred. Upon complete dissolution of the hexachlorobenzene, 13.2 g potassium carbonate (0.096 mol) was added. The mixture was stirred at 110° C. for four hours, then 76.05 g Fluorolink D10(0.076 mol) were added. The reaction mixture was stirred overnight at 110° C., then allowed to cool and washed with an equal volume of water. Concentration and removal of any residual water by rotary evaporation yielded a liquid with a refractive index of 1.338 at the sodium D line. The infrared spectrum of this liquid exhibited a strong aromatic ether peak at 1636 cm−1. This liquid is believed to be the —O— linked alcohol having the structure

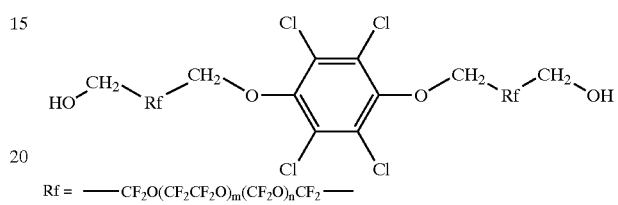

Rf = —CF₂O(CF₂CF₂O)ₘ(CF₂O)ₙCF₂—

In a three-neck flask equipped with a mechanical stirrer, a dropping probe and a thermocouple were combined 53.1 g of the above diol (0.024 mol), 0.1 g BHT, 11.6 mL triethylamine (0.083 mol), and 100 mL ethyl nonafluorobutyl ether. The reaction mixture was cooled with ice, and 5.6 mL acryloyl chloride (0.069 mol) was added dropwise. The temperature of the reaction mixture was maintained below 30° C. during the addition. The reaction mixture was stirred at room temperature for one hour.

The reaction mixture was washed three times with an equal volume of methanol, then concentrated by rotary evaporation and passed through a 0.2 μm filter. NMR has confirmed the molecular structure of the resultant colorless liquid to be:

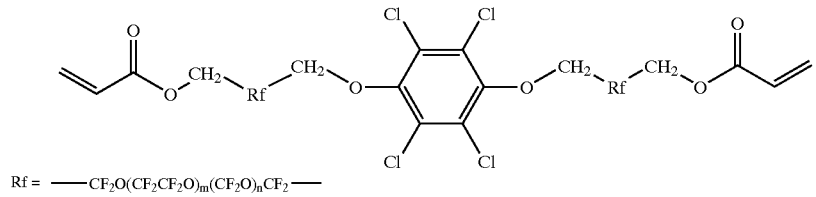

Rf = —CF₂O(CF₂CF₂O)ₘ(CF₂O)ₙCF₂—

This compound had a liquid loss of 0.15 dB/cm at a wavelength of 1550 nm. This compound had a $C_H$ of about 10 M. α,α-diethoxyacetophenone (1 wt %) was added to a small sample of the compound. The resulting energy curable composition was cured for 300 seconds with UV light while being purged with nitrogen. The refractive index of the cured sample was 1.344 at a wavelength of 1550 nm.

Example 4

In a three-neck flask, equipped with a mechanical stirrer, condenser and thermocouple, were combined 100 g (0.1 mol) FLUOROLINK D10, 17 g decafluorobiphenyl (0.05 mol), 18 g potassium carbonate (0.13 mol), and 500 mL N,N-dimethylacetamide. The reaction mixture was stirred overnight at 110° C. under nitrogen. The reaction mixture was allowed to cool, washed with water, and concentrated by rotary evaporation to yield the —O— linked alcohol intermediate.

In a three neck flask, equipped with a mechanical stirrer, dropping funnel and thermocouple, were combined the —O— linked alcohol intermediate, 9 mL acryloyl chloride (0.11 mol), 0.1 g BHT. The reaction mixture was stirred at 70 C for three hours. The reaction mixture was cooled with ice, and 15 mL triethylamine were added dropwise. The temperature of the reaction mixture was maintained below 30° C. during the addition. The reaction mixture was stirred at room temperature overnight, then washed three times with methanol, concentrated by rotary evaporation, and passed through a 0.2 μm filter. NMR has confirmed the molecular structure of the resultant colorless liquid to be:

hours. The reaction mixture was allowed to cool, and its pH was brought to less than 3.5 by the addition of 10% aqueous sulfuric acid. The reaction mixture was washed twice with water and concentrated by rotary evaporation to yield the —S— linked alcohol.

In a three-neck flask equipped with a dropping funnel, a mechanical stirrer, and a thermocouple were combined 33 g of the —S— linked alcohol (0.015 mol), 100 mL ethyl nonafluorobutyl ether, 0.05 g BHT, and 3.9 mL acryloyl chloride (0.048 mol).

The reaction mixture was cooled with ice, and 7.3 mL triethylamine (0.052 mol) was added dropwise. The temperature of the reaction mixture was maintained below 30° C. during the addition. The reaction mixture was stirred at

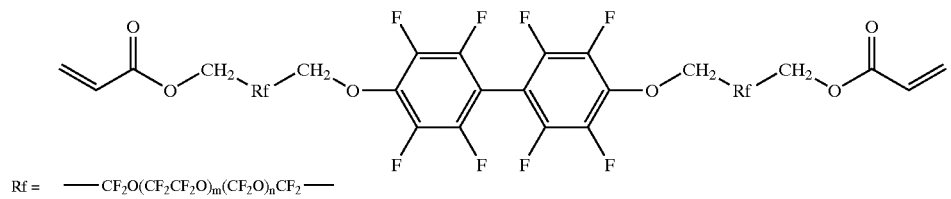

Rf = —$CF_2O(CF_2CF_2O)_m(CF_2O)_nCF_2$—

This compound had a liquid loss of 0.10 dB/cm at a wavelength of 1550 nm. This compound had a $C_H$ of about 10 M. α,α-diethoxyacetophenone (1 wt %) was added to a small sample of the compound. The resulting energy curable composition was cured for 300 seconds with UV light while being purged with nitrogen. The refractive index of the cured sample was 1.340 at a wavelength of 1550 nm.

Example 5

In a three-neck flask, equipped with a dropping funnel, mechanical stirrer and thermocouple, were combined 93.9 g FLUOROLINK D10 (0.094 mol) and 37 mL nonafluorobutanesulfonyl fluoride (0.21 mol). The mixture was cooled with ice, and 32 mL triethylamine was added dropwise. The temperature of the reaction mixture was maintained below 30° C. during the addition. The reaction mixture was stirred for one hour at room temperature, after which time infrared spectroscopy indicated that the FLUOROLINK hydroxyls had reacted completely. The sample was washed once with methanol and concentrated by rotary evaporation to yield FLUOROLINK D10 bis(nonafluorosulfonate).

In a three-neck flask equipped with a condenser a thermocouple and a magnetic stir bar were combined 72.7 g FLUOROLINK D10 bis(nonafluorosulfonate), 5.25 g dipotassium 1,5-dimercaptothiadiazole, and 100 mL dimethyl sulfoxide. The reaction mixture was magnetically stirred at 100° C. overnight, then 13 mL 4M NaOH was added and the reaction mixture was magnetically stirred at 100° C. for six room temperature for one hour, washed three times with methanol, concentrated by rotary evaporation, and passed through a 0.2 μm filter. NMR has confirmed that the resultant colorless liquid is about 40% FLUOROLIK D10 diacrylate and about 60%

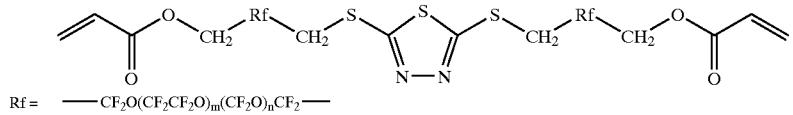

Rf = —$CF_2O(CF_2CF_2O)_m(CF_2O)_nCF_2$—

This composition had a liquid loss of 0.25 dB/cm at a wavelength of 1550 nm. The —S— linked compound had a $C_H$ of about 11 M. FLUOROLINK D10diacrylate had a $C_H$ of about 14 M. The overall composition has a $C_H$ of about 12.3 M. α,α-diethoxyacetophenone (1 wt %) was added to a small sample of the compound, and the resulting energy curable composition was cured for 300 seconds with UV light while being purged with nitrogen. The refractive index of the cured sample was 1.336 at a wavelength of 1550 nm.

Example 6

In a 3-neck flask, equipped with a mechanical stirrer and a condenser were combined 100 g fluorinated tetraethylene glycol ($HOCH_2CF_2O$)($CF_2CF_2O)_2CF_2CH_2OH$, 0.24 mol); 40 g hexachlorobenzene; 5.6 g sodium sulfite (0.068 mol); 80 g potassium carbonate (0.55 mol); 0.10 g butylated hydroxytoluene; and 300 mL dimethyl sulfoxide. The mixture was heated to 100° C. and stirred mechanically overnight. The mixture was cooled to room temperature, washed three times with deionized water, and concentrated by rotary evaporation at 70° C. for an hour under vacuum to remove solvent. The resultant liquid is believed to be the —O— linked alcohol having the structure

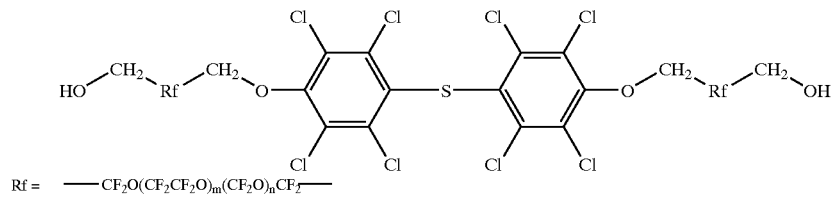

Rf = —CF$_2$O(CF$_2$CF$_2$O)$_m$(CF$_2$O)$_n$CF$_2$—

The substantially solvent-free mixture was dissolved in 200 mL HFE7200, a fluorinated solvent available from 3M, and filtered using a 0.2 micron filter. To the filtered mixture was added 40 mL acryloyl chloride (0.47 mol). Triethylamine (64 mL, 0.46 mol) was added dropwise with mechanical stirring, while a temperature of between 40° C. and 50° C. was maintained using an ice bath. A white precipitate formed upon addition of the triethylamine. The mixture was stirred mechanically for 4 hours, filtered using a 0.2 micron filter, then washed three times with an equal volume of water. The mixture was concentrated using rotary evaporation at 70 C for an hour under vacuum, yielding the diacrylate corresponding to the —O— linked alcohol given above.

This compound had a liquid loss of 0.21 dB/cm at a wavelength of 1550 nm, and had a viscosity of about 55 cP. α,α-diethoxyacetophenone (1 wt %) was added to a small sample of the compound. The resulting energy curable composition was cured for 300 seconds with UV light while being purged with nitrogen. The refractive index of the cured sample was 1.440 at a wavelength of 1550 nm.

Example 7

Core, clad and buffer compositions were formulated according to the table below:

| Composition | Material of Example 1 | Perfluorinated polyether diacrylate | 2,2-Diethoxy-acetophenone |
|---|---|---|---|
| Core | 100 parts by weight | | 1 part by weight |
| Clad | 55 parts by weight | 45 parts by weight | 1 part by weight |
| Buffer | | 100 parts by weight | 1 part by weight |

The perfluorinated ether diacrylate has the structure

CH$_2$=CHCO$_2$CH$_2$CF$_2$(CF$_2$CF$_2$O)$_m$(CF$_2$O)$_n$CF$_2$CH$_2$O$_2$CCH=CH$_2$, and has a molecular weight of about 2100. This material may be made by acrylation of FLUOROLINK D, available from Ausimont USA, Red Bank, N.J.

An unoxidized four inch silicon wafer was cleaned by immersion in 4M aqueous sodium hydroxide for one hour, followed by rinsing with deionized water for 12 minutes. The wafer was blown dry with nitrogen and further dried on a 120° C. hotplate for 10 minutes. The wafer was allowed to cool, and then treated with neat (3-acryloxypropyl)trichlorosilane using a cleanroom swab. Excess silane was removed from the wafer surface by ethanol washing followed by a gentle wipe with a cleanroom cloth to remove particulate matter. The wafer was rinsed with ethanol while spinning on a spin coater, then dried on a 120° C. hotplate for two minutes.

The core, clad and buffer compositions were filtered through 0.11 μm TEFLON filters, and loaded into 10 mL pipettors. The wafer was centered on the chuck of a stainless steel spin coater (available from the Cost Effective Equipment division of Brewer Science, Inc., Rolla, Mo.). About 7 mL of buffer composition was dispensed onto the center of the wafer, and the wafer was spun to yield a 10 μm thick layer of the buffer composition. The spin program was 150 rpm for 30 sec; and ramp at 100 rpm/sec to 700 rpm for 20 sec. In the 700 rpm part of the program, a small nozzle dispensed acetone along the top edge and along the bottom edge of the wafer for edge bead removal.

The wafer was then transferred to a leak-free vacuum-purge chamber with an internal volume of 3 liters was used. The chamber was constructed with aluminum walls, VITON o-rings and quartz window, and allowed for both evacuation of air and nitrogen purging. Clamps on the box lid and a check valve were used to ensure that a positive pressure of nitrogen could be established during purging. This also ensured that no air could leak in during the purge cycle. Likewise, air could easily be eliminated in the vacuum cycle by ensuring that the chamber was leak free. Typically, the chamber could be evacuated to 0.2 Torr or less with a standard rotary vein mechanical pump. For process consistency, a standard purge cycle was established. Vacuum was applied for 30 seconds until a level of 6 Torr was reached. This was followed by 2 minutes of nitrogen purging at 9.9 L/min. The wafer was then illuminated for 37 seconds at approximately 10.9 W/cm$^2$ through a 3° diffuser using a Tamarack UV light source to partially polymerize the buffer layer.

The wafer was recentered on the spin coater chuck, approximately 7 mL of the clad composition was applied, and the wafer was spun to yield a 2 μm thick layer of the clad composition. The spin program was 150 rpm for 30 sec; ramp at 100 rpm/sec to 6000 rpm for 50 sec; and ramp at 100 rpm/sec to 700 rpm for 20 sec. In the 700 rpm part of the program, a small nozzle dispensed acetone along the top edge and along the bottom edge of the wafer for edge bead removal. The wafer was then transferred to the vacuum-purge chamber. Vacuum was applied for 30 seconds until a level of 6 Torr was reached. This was followed by 2 minutes of nitrogen purging at 9.9 L/min. The wafer was then illuminated for 40 seconds at approximately 10.9 W/cm$^2$ through a 3° diffuser using a Tamarack UV light source, partially polymerizing the clad layer.

The wafer was recentered on the spin coater chuck, approximately 7 mL of the core composition was applied, and the wafer was spun to yield a 6 μm thick layer of the core composition. The spin program was 150 rpm for 30 sec; ramp at 100 rpm/sec to 4000 rpm for 50 sec; and ramp at 100 rpm/sec to 700 rpm for 20 sec. In the 700 rpm part of the program, a small nozzle dispensed acetone along the top edge and along the bottom edge of the wafer for edge bead removal. Using a 5 mL syringe, GALDEN HT110 perfluorinated ether solvent (Ausimont USA) was used to rinse the core composition from the outer 1 cm of the wafer.

The wafer was then placed onto a vacuum chuck in the vacuum purge box. A harness fabricated from 25 mm thick plastic sheet with a 5 inch diameter hole in the center and with five small loops of 35 mm thick wire attached to it, was lowered onto the wafer, with the loops of wire resting on the 1 cm edge of the wafer that is free from core composition. A photomask was lowered into position over the wafer and rested on a retractable plastic wedge at an elevated angle off the wafer. The photomask has transparent areas defining the core of a waveguide. The box is closed, and vacuum was applied to the box for 30 seconds, or until the pressure falls to approximately 6 Torr. This was followed by 2 minutes of nitrogen purging at 9.9 L/min. The wedge was retracted, allowing the photomask to rest on the loops of 35 mm wire of the harness. The wafer was then exposed for 100 seconds at 10.9 W/cm$^2$ using a Tamarack UV light source without a diffuser. Areas of the core layer that were allowed by the photomask to be exposed were partially polymerized, while areas of the core layer that were not allowed to be exposed remained substantially unpolymerized. The wedge was replaced, lifting the photomask, and the wafer was removed from the box.

The wafer was recentered on the spin coater chuck, and spun at 1300 rpm for 60 seconds. For the first 40 seconds of this spin cycle, the wafer was rinsed with GALDEN HT110 solvent using a squeeze bottle to remove any unpolymerized core composition. As a result of this development step, only the partially polymerized areas of the core layer remain on the wafer.

The wafer was recentered on the spin coater chuck. About 7 mL of clad was applied to the surface of the wafer, and the wafer was spun to yield a 15 $\mu$m thick layer of the clad composition. The spin program was 150 rpm for 30 sec, and than ramp at 100 rpm/sec to 700 rpm for 30 sec. In the 700 rpm part of the program, a small nozzle dispensed acetone along only the bottom edge of the wafer for edge bead removal. The wafer was then transferred to the vacuum-purge chamber. Vacuum was applied for 30 seconds until a level of 6 Torr was reached. This was followed by 2 minutes of nitrogen purging at 9.9 L/min. The wafer was then illuminated for 500 seconds at approximately 10.9 W/cm$^2$ through a 3° diffuser using a Tamarack UV light source, partially polymerizing the clad layer.

The loss of the waveguide so fabricated was measured using the cutback method on a Newport AUTOALIGN system. Waveguides of up to 5.5 cm in length made by the method of this example have propagation losses of about 0.08 dB/cm at 1550 nm.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An energy curable composition comprising:
   a compound having an isocyanurate moiety, three fluorinated alkylene, arylene, or polyether moieties linked to the isocyanurate moiety at the nitrogens of the isocyanurate, and at least one ethylenically unsaturated moiety linked to one of the fluorinated alkylene, arylene, or polyether moieties;
   wherein the compound has formula:

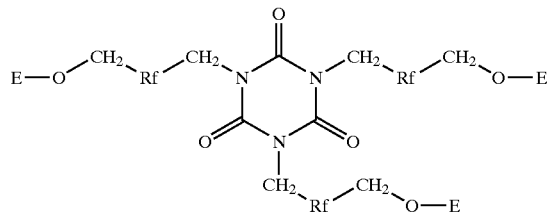

wherein Rf includes a fluorinated alkylene, arylene or polyether moiety and E is an ethylenically unsaturated moiety.

2. The energy curable composition of claim 1 wherein the compound has the formula selected from the group consisting of:

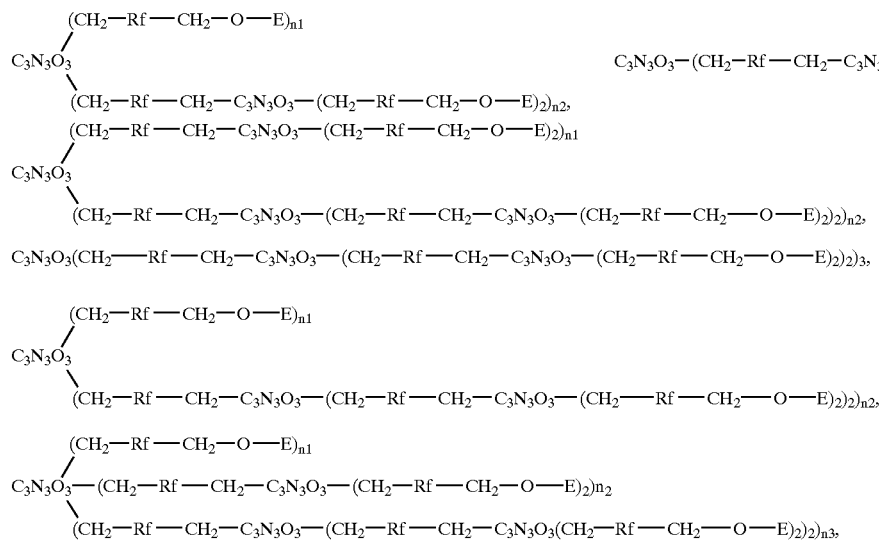

wherein $C_3N_3O_3$ is the isocyanurate nucleus; each Rf includes a fluorinated alkylene moiety, a fluorinated arylene moiety, or a fluorinated polyether moiety; each E is an ethylenically unsaturated moiety; each n subscript is 0, 1, 2 or 3; and the sum of the n subscripts in each formula is 3.

3. The energy curable composition of claim 1 wherein the fluorinated alkylene, arylene or polyether moiety is selected from the group consisting of —$(CF_2)_x$—, —$(C_6F_4)_x$— —$CF_2O$—[$(CF_2CF_2O)_m(CF_2O)_n$]—$CF_2$—, —$CF(CF_3)O(CF_2)_4O[CF(CF_3)CF_2O]_pCF(CF_3)$—, and —$CF_2O$—$(CF_2CF_2O)_m$—$CF_2$—

—$CF_2CF_2O$—$(CF_2CF_2CF_2O)$—$CF_2CF_2$—,

—$CF_2CF_2O$—$(CF_2CF_2CF_2CF_2O)_h$—$CF_2CF_2CF_2$—,

—$CF_2O$—$(CF_2CF_2O)_m$—$(CF_2CF_2CF_2O)_h$—$(CF_2CF_2CF_2O)_k$—$CF_2$—, and

—$CF_2O$—$(CF_2CF_2O)_m$—$(CF_2CF_2CF_2O)_i$—$CF_2CF_2O$—$(CF_2CF_2O)_j$—$(CF_2CF_2O)_kCF_2$—, wherein x is an integer between 1 and about 10;

k and m designate numbers of randomly distributed perfluoroethyleneoxy backbone repeating substituents and can be integer or zero;

i and j designate numbers of randomly distributed perfluoropropyleneoxy backbone repeating substituents and can be integer or zero;

h designates the number of randomly distributed perfluorobutyleneoxy backbone repeating substituents and can be integer or zero;

n designates the number of randomly distributed perfluoroethyleneoxy and perfluoromethyleneoxy backbone repeating subunits and can be integer or zero; and p designates the number of —$CF(CF_3)CF_2O$— backbone repeating subunits and can be integer or zero.

4. The energy curable composition of claim 1 wherein each ethylenically unsaturated moiety is selected from the group consisting of acrylate, methacrylate, haloacrylate, halomethacrylate, vinyl ether and allyl ether.

5. The energy curable composition of claim 1 having a $C_H$ of less than about 55 M.

6. The energy curable composition of claim 1 having a $C_H$ of less than about 20 M.

7. The energy curable composition of claim 1 wherein the compound is present in an amount of at least 10% by weight.

8. A polymeric material, the polymeric material comprising a polymer or copolymer of an energy curable composition including a compound having an isocyanurate moiety, three fluorinated alkylene, arylene, or polyether moieties linked to the isocyanurate moiety at the nitrogens of the isocyanurate, and at least one ethylenically unsaturated moiety linked to one of the fluorinated alkylene, arylene, or polyether moieties.

9. The polymeric material of claim 8 wherein the energy curable compound has the formula:

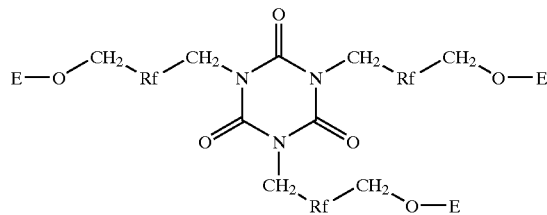

wherein Rf includes a fluorinated alkylene, arylene or polyether moiety and E is an ethylenically unsaturated moiety.

10. The polymeric material of claim 8 wherein the fluorinated alkylene, arylene or polyether moiety is selected from the group consisting of —$(CF_2)_x$—, —$(C_6F_4)_x$— —$CF_2O$—[$(CF_2CF_2O)_m(CF_2O)_n$]—$CF_2$—, —$CF(CF_3)O(CF_2)_4O[CF(CF_3)CF_2O]_pCF(CF_3)$—, and —$CF_2O$—$(CF_2CF_2O)_m$—$CF_2$—

—$CF_2CF_2O$—$(CF_2CF_2CF_2O)$—$CF_2CF_2$—,

—$CF_2CF_2O$—$(CF_2CF_2CF_2CF_2O)_h$—$CF_2CF_2CF_2$—,

—$CF_2O$—$(CF_2CF_2O)_m$—$(CF_2CF_2CF_2O)_h$—$(CF_2CF_2CF_2O)_k$—$CF_2$—, and

—$CF_2O$—$(CF_2CF_2O)_m$—$(CF_2CF_2CF_2O)_i$—$CF_2CF_2O$—$(CF_2CF_2O)_j$—$(CF_2CF_2O)_kCF_2$—, wherein x is an integer between 1 and about 10;

k and m designate numbers of randomly distributed perfluoroethyleneoxy backbone repeating substituents and can be integer or zero;

i and j designate numbers of randomly distributed perfluoropropyleneoxy backbone repeating substituents and can be integer or zero;

h designates the number of randomly distributed perfluorobutyleneoxy backbone repeating substituents and can be integer or zero;

n designates the number of randomly distributed perfluoroethyleneoxy and perfluoromethyleneoxy backbone repeating subunits and can be integer or zero; and p designates the number of —$CF(CF_3)CF_2O$— backbone repeating subunits and can be integer or zero.

11. The polymeric material of claim 8 having a $C_H$ of less than about 55 M.

12. The polymeric material of claim 8 having $C_H$ of less than about 20 M.

13. The polymeric of claim 8 having an absorption loss of less than about 0.5 dB/cm at 1550 nm.

14. An optical element comprising a polymeric core, the polymeric core including a polymer copolymer of an energy curable compound having an isocyanurate moiety, three fluorinated alkylene, arylene, or polyether moieties linked to the isocyanurate moiety at the nitrogens of the isocyanurate, and at least one ethylenically unsaturated moiety linked to one of the fluorinated alkylene, arylene, or polyether moieties.

15. The optical element of claim 14 wherein the fluorinated alkylene, arylene or polyether moiety is selected from the group consisting of —$(CF_2)_x$—, —$(C_6F_4)_x$— —$CF_2O$—[$(CF_2CF_2O)_m(CF_2O)_n$]—$CF_2$—, —CF(CF$_3$)O(CF$_2$)$_4$O[CF(CF$_3$)CF$_2$O]$_p$CF(CF$_3$)—, and —CF$_2$O—(CF$_2$CF$_2$O)$_m$—CF$_2$—

—CF$_2$CF$_2$O—(CF$_2$CF$_2$CF$_2$O)—CF$_2$CF$_2$—,

—CF$_2$F$_2$CF$_2$O—(CF$_2$CF$_2$CF$_2$CF$_2$O)$_h$—CF$_2$CF$_2$CF$_2$—,

—CF$_2$O—(CF$_2$CF$_2$O)$_m$—(CF$_2$CF$_2$CF$_2$O)$_h$—CF$_2$CF$_2$CF$_2$O)$_k$—CF$_2$—, and —CF$_2$O—(CF$_2$CF$_2$O)$_m$—(CF$_2$CF$_2$CF$_2$O)$_i$—CF$_2$CF$_2$O—(CF$_2$CF$_2$O)$_j$—(CF$_2$CF$_2$O)$_k$CF$_2$—, wherein x is an integer between 1 and about 0;

k and m designate members of randomly distributed perfluoroethyleneoxy backbone repeating substituents and can be integer or zero;

i and j designate numbers of randomly distributed perfluoropropyleneoxy backbone repeating substituents and can be Integer or zero;

h designates the number of randomly distributed perfluorobutyleneoxy backbone repeating substituents and can be integer or zero;

n designates the number of randomly distributed perfluoroethyleneoxy and perfluoromethyleneoxy backbone repeating subunits and can be integer or zero; and p designates the number of —CF(CF$_3$)CF$_2$O— backbone repeating subunits and can be integer or zero.

16. The optical element of claim 14 wherein the polymeric core has a C$_H$ of less than about 55M.

17. The optical element of claim 14 wherein the polymeric core has an absorption loss of less than about 0.5 dB/cm at 1550 nm.

* * * * *

UNITED STATES PATENT AND TRADEMARK OFFICE
CERTIFICATE OF CORRECTION

PATENT NO. : 6,943,232 B2 Page 1 of 1
APPLICATION NO. : 10/253057
DATED : September 13, 2005
INVENTOR(S) : Blomquist Robert and Deng Jian Ming S.

It is certified that error appears in the above-identified patent and that said Letters Patent is hereby corrected as shown below:

Column 31,
Line 11, "-$(C_6F_4)_x$--$CF_2O$-$[(CF_2CF_2O)_m(CF_2O)_n]$-$CF_2$-," should read -- -$C_6F_4)_x$-, -$CF_2O$-$[(CF_2CF_2O)_m(CF_2O)_n]$-$CF_2$-, --.
Line 16, "-$CF_2O$-$(CF_2CF_2O)_m$-$CF_2$-" should read -- -$CF_2O$-$(CF_2CF_2O)_m$-$CF_2$-, --.

Column 32,
Line 19, "-$(C_6F_4)_x$--$CF_2O$-$[(CF_2O)_m(CF_2O)_n]$-$CF_2$-," should read -- -$(C_6F_4)_x$-, -$CF_2O$-$[(CF_2CF_2O)_m(CF_2O)_n]$-$CF_2$-, --.
Line 22, "-$CF_2O$-$(CF_2CF_2O)_m$-$CF_2$-" should read -- -$CF_2O$-$(CF_2CF_2O)_m$-$CF_2$-, --.
Line 67, "-$(C_6F_4)_x$--$CF_2O$-$[(CF_2CF_2O)_m(CF_2O)_n]$-$CF_2$-," should read -- -$C_6F_4)_x$-, -$CF_2O$-$[(CF_2CF_2O)_m(CF_2O)_n]$-$CF_2$-, --.

Column 33,
Line 2, "-$CF_2O$-$(CF_2CF_2O)_m$-$CF_2$-" should read -- -$CF_2O$-$(CF_2CF_2O)_m$-$CF_2$-, --.

Signed and Sealed this

Twentieth Day of June, 2006

JON W. DUDAS
*Director of the United States Patent and Trademark Office*